United States Patent [19]

Ginzler

[11] 4,273,310
[45] Jun. 16, 1981

[54] DEVICE FOR BLOCKING OR RELEASING FLUID FLOW

[76] Inventor: Peter Ginzler, Kaiser-Friedrich-Ring 67, Wiesbaden, Fed. Rep. of Germany

[21] Appl. No.: 67,862

[22] Filed: Aug. 20, 1979

[51] Int. Cl.³ .................... F16K 31/44; F16K 15/00
[52] U.S. Cl. .................................. 251/211; 251/82; 137/522; 137/DIG. 2
[58] Field of Search .............. 251/211, 82; 137/522, 137/523, DIG. 2

[56] References Cited

U.S. PATENT DOCUMENTS

| | | | |
|---|---|---|---|
| 865,151 | 9/1907 | Andrew | 137/522 |
| 1,334,870 | 3/1920 | Lowry | 251/211 |
| 1,759,798 | 5/1930 | Murphy et al. | 137/522 |
| 1,992,490 | 2/1935 | Lewis | 251/82 |
| 2,237,014 | 4/1941 | Stoehrer | 251/211 |
| 2,456,276 | 12/1948 | Harstick | 251/211 |
| 2,942,618 | 6/1960 | Hodges | 137/458 |
| 3,305,212 | 2/1967 | Beach | 251/320 |

FOREIGN PATENT DOCUMENTS

| | | | |
|---|---|---|---|
| 142417 | 7/1903 | Fed. Rep. of Germany | 251/82 |
| 1371834 | 8/1964 | France | |
| 654851 | 7/1951 | United Kingdom | 251/82 |
| 1078808 | 8/1967 | United Kingdom | |

*Primary Examiner*—Martin P. Schwadron
*Assistant Examiner*—A. Michael Chambers
*Attorney, Agent, or Firm*—Biebel, French & Nauman

[57] ABSTRACT

A device for blocking or releasing the flow of a gaseous or liquid medium therethrough by means of a valve ball which is situated in a valve seat includes a release bar which can be moved such that the valve ball is moved relative to the valve seat. The longitudinal axis of the release bar is disposed at an angle in the range of 20°-100° to the direction of flow of the gaseous or liquid medium.

3 Claims, 3 Drawing Figures

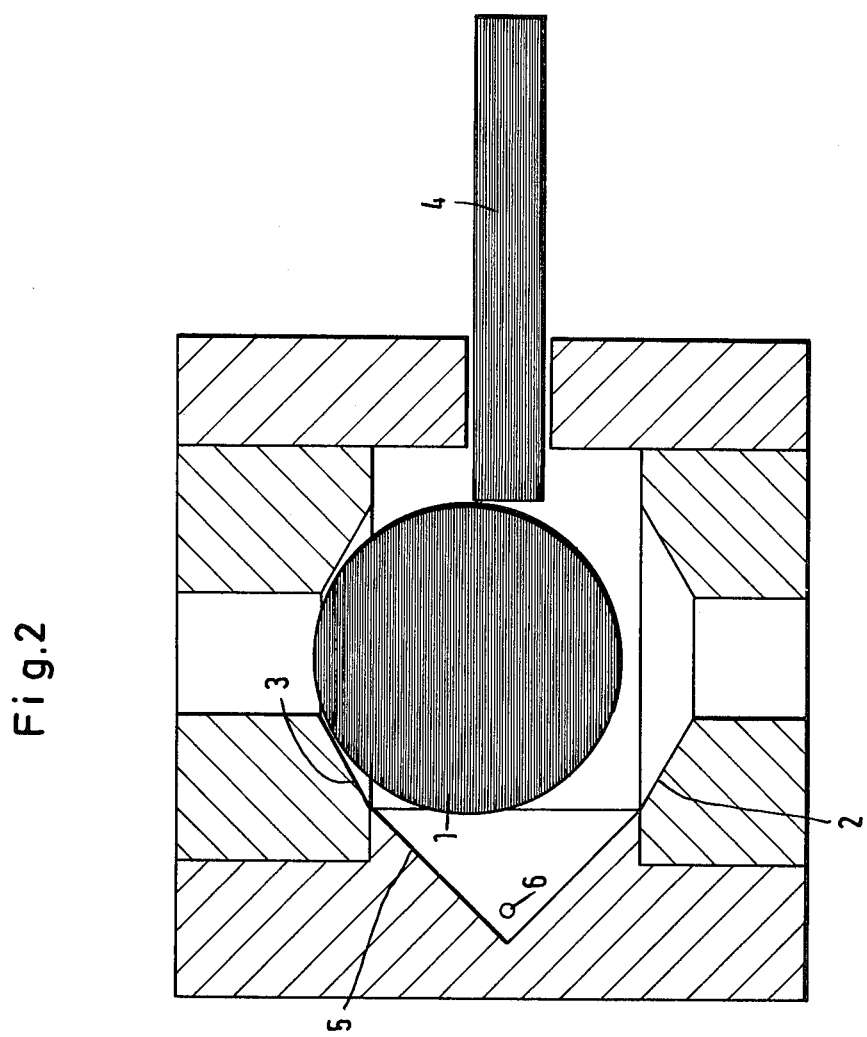

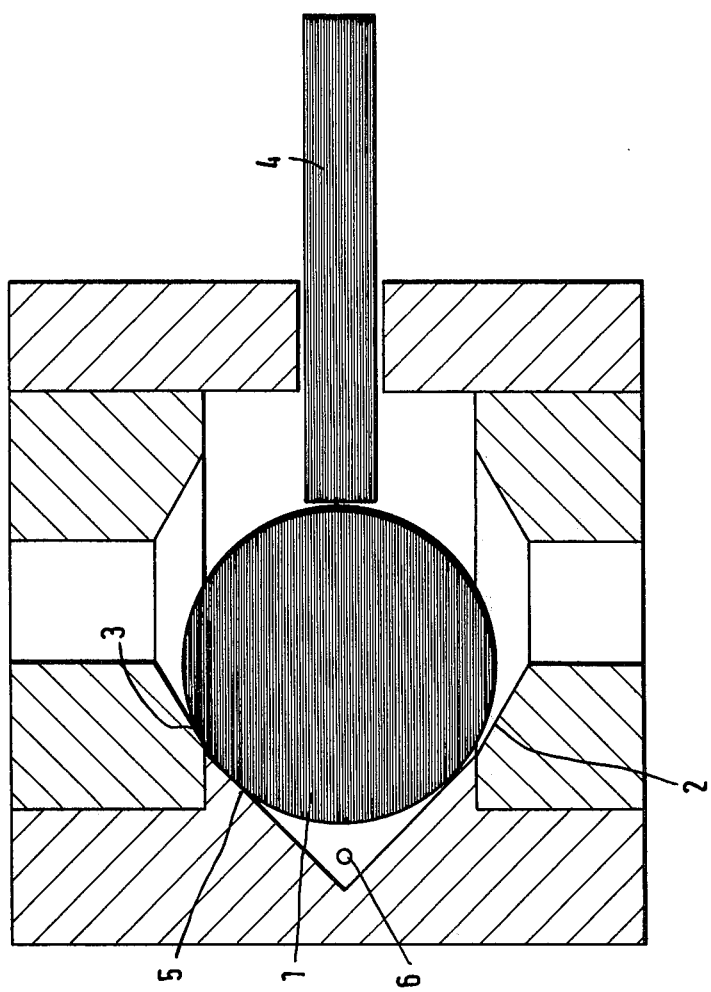

DEVICE FOR BLOCKING OR RELEASING FLUID FLOW

BACKGROUND OF THE INVENTION

The invention relates to a device for blocking or releasing the flow-through of a gaseous or liquid medium and, more particularly, to a valve in which a ball is positioned in a conical or spherical valve seat and is movable relative to the seat by means of a release bar.

In known devices of this type, the releasing rod acts on the ball, urging it in a direction opposite the direction in which the ball is moved by the fluid pressure. This is somewhat disadvantageous in that the force required to lift the valve ball from the seat must exceed a certain threshold force. Typically, this threshold force is substantial and, therefore, prior art valves have necessarily been relatively large and have required powerful drives.

It is seen that there is a need, therefore, for a valve device of the above-described type which requires a relatively small releasing force.

SUMMARY OF THE INVENTION

According to the present invention, a ball valve is provided which requires a reduced force. This is accomplished by arranging the longitudinal axis of the release bar at an angle in the range of approximately 20°–100°, preferably 90°, to the direction of flow of the fluid medium. Only static friction need be overcome with the valve of the present invention. It has been determined that the shifting force needed to overcome static friction, this force being equal to the product of normal force N and coefficient of friction $\mu$, can be reduced to 1/10 of the values previously obtainable. This is accomplished in one embodiment by welding and hardening the steel elements such that the coefficient of friction, $\mu$, is reduced to a value of less than 0.1 of previous obtainable values.

The valve in accordance with the invention closes and opens in the forward direction as well as in the reverse direction with only a single valve ball. Therefore the valve can be used very practically as a controllable pipebreak protection.

As a further feature of the invention, a receiving cone is disposed near the valve seat. The valve ball, pressed out of the valve seat by the release bar, is received into this receiving cone. The release bar thereafter holds the valve ball securely in the receiving cone, and the fluid medium may flow freely through the valve. When the control force is removed from the release bar, the valve ball moves automatically with the flow of the fluid medium, into one of the valve seats and prevents flow through the valve.

A valve according to the present invention may advantageously include a pair of opposing valve seats. In this way, fluid flow may be controlled through the valve in both direction utilizing only a single valve ball. By utilizing the controlled release bar, both flow-through apertures can be opened, since the valve ball may be pressed from either valve seat into the receiving cone by the bar. Preferably, the direction of flow of the fluid medium, between the valve seats, is disposed at an angle of 20°–100°, preferably 90°, to the longitudinal axis of the release bar. By this arrangement the valve of the present invention can be opened and closed with much smaller release force than has been required with prior art valves.

Furthermore, it may be advantageous to provide a pressure equalizing opening in the bottom of the receiving cone, so that after control force is removed from the release bar, the valve ball may move out of the receiving cone and is not held in the receiving cone by the pressure of the fluid medium. This opening, positioned in the rear end of the receiving cone, is connected by means of suitable channels to the space between the valve seats through which the fluid medium flows.

Further advantages, features, and possibilities of application of the instant invention will appear from the following description in connection with the drawings.

BRIEF DESCRIPTION OF THE DRAWINGS

FIG. 2 is a view similar to FIG. 1, with the valve ball being situated on the other valve seat; and FIG. 3 is a view similar to FIG. 1, but with a control force being applied to the release bar and the valve ball being held in the receiving cone.

DETAILED DESCRIPTION OF THE PREFERRED EMBODIMENT

Figure 1:
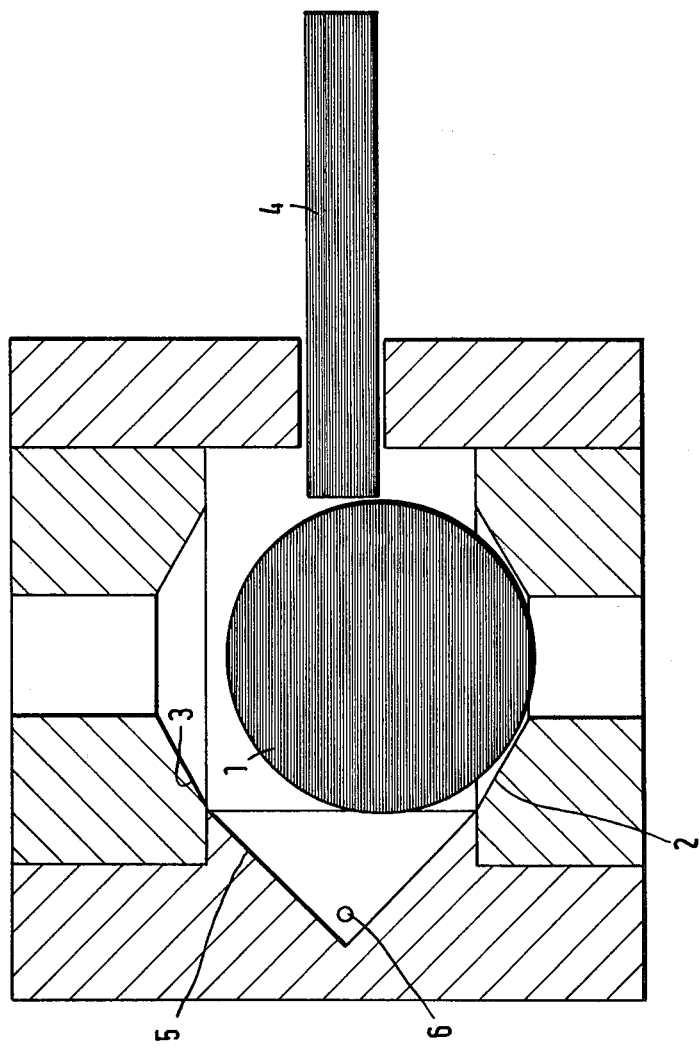
FIG. 1 shows the device according to the invention schematically in section, without a control force applied to the release bar and with the valve ball situated on a valve seat.

FIGS. 1–3 show schematically, in section, the essential portion of the device of the present invention for blocking or releasing the flow of a fluid medium. The valve ball 1, as shown in FIG. 1, is positioned in a conical valve seat 2, while the valve ball 1, as shown in FIG. 2, is positioned on the conical valve seat 3. In both cases, a solenoid actuator (not shown), which is connected to release bar 4, is not actuated and no control force is applied to release bar 4.

A vertical dashed line extends between the axii of valve seats 2 and 3 and passes through the center of valve ball 1 in FIGS. 1 and 2. The longitudinal axis of the release bar 4 is disposed at approximately 90° with respect to this dashed line.

To the side of the valve ball lying opposite the release ball 4, a receiving cone 5 is defined within the valve housing. A boring or opening 6 connects the bottom of cone 5 to the space to the right of the valve ball when the ball 1 is situated as shown in FIG. 3. This provides pressure equalization between the said space to the right of the valve ball and the cone 5. A reduced pressure condition cannot develop within cone 5, therefore. Such a reduced pressure condition, if it should occur, would tend to hold the ball 1 within cone 5 and would prevent the return of the ball to the appropriate valve seat after the control force is removed and the release bar retracted into the position shown in FIGS. 1 and 2.

In the operation, when the fluid medium passes downwardly through the valve seat 3, the valve ball 1 is driven in the direction of flow and is seated on the oppositely-lying valve seat 2, as shown in FIG. 1. The valve is therefore closed. Similarly, when fluid flow is reversed and the fluid medium flows upwardly through valve seat 2, the valve ball 1 is pressed onto the valve seat 3, and the valve is again blocked, as shown in FIG. 2.

If fluid flow through the valve is desired—that is, a flow of the fluid medium between the valve seat 2 and the valve seat 3—then the release bar 4 is moved to the left, as shown in FIG. 3. The valve ball 1 is moved to the left, out of the valve seat 2 or 3 in which it was previously situated and into the receiving cone 5. Thus, the valve ball 1 is shifted laterally along the valve seat 2 or 3 by means of the release bar 4, and the valve is opened to permit fluid flow therethrough. Release bar 4 may be actuated hydraulically, electromechanically, or pneumatically. The valve arrangement requires only 20% of the force which would be necessary to lift the valve ball out of the valve seat by prior art techniques.

The release bar 4 is held in the position shown in FIG. 3, so that it also holds the valve ball 1 in the receiving cone 5. Depending upon the direction of flow, the valve ball 1, when the release bar 4 is retracted, is moved again into the valve seat 2 or 3 along with the flow of the fluid medium, and thus blocks the flow of fluid through the valve.

While the form of apparatus herein described constitutes a preferred embodiment of the invention, it is to be understood that the invention is not limited to this previse form of apparatus, and that changes may be made therein without departing from the scope of the invention.

What is claimed is:

1. A valve for controlling fluid flow therethrough, comprising
    valve body means defining a cavity therein and first and second opposing fluid flow passages communicating with said cavity, for fluid flow between said first and second opposing fluid flow passages through said cavity, said valve body means further defining a first tapered metallic valve seat in said cavity surrounding said first fluid flow passage and a second tapered metallic valve seat in said cavity surrounding said second fluid flow passage, said valve body means further defining a conical recess in said cavity intermediate said first and second tapered valve seats, said recess having its central axis substantially perpendicular with respect to the direction of fluid flow between said first and second fluid flow passages,
    a valve ball in said cavity for movement into sealing engagement with said first and second tapered metallic valve seats by fluid flow between said first and second fluid flow passages to prevent further fluid flow through said cavity,
    a release bar extending through an opening in said valve body means opposite said conical recess, said release bar being slidably mounted for movement into said cavity in a direction substantially perpendicular to said fluid flow between said first and second opposing fluid flow passages to contact said valve ball and press said valve ball into said conical recess, thereby permitting fluid flow through said cavity and wherein said valve body means further defines a fluid passageway from said recess to said cavity to equalize pressure within said recess when said valve ball is positioned in said recess, thereby facilitating movement of said ball from said recess into engagement with said first or second tapered metallic valve seats upon movement of said release bar away from said recess.

2. The valve of claim 1 in which said first and second tapered metallic valve seats are substantially conical in shape.

3. The valve of claim 1 in which said first and second tapered metallic valve seats are substantially spherical in shape.

* * * * *